Dec. 12, 1933.        C. R. SHORT ET AL        1,939,467
METHOD OF MAKING BEARINGS
Filed May 3, 1929

Inventor
Charles R. Short
Roland P. Koehring
By Spencer Hardman & Fehr
their Attorneys Patented Dec. 12, 1933

1,939,467

UNITED STATES PATENT OFFICE 1,939,467

METHOD OF MAKING BEARINGS

Charles R. Short and Roland P. Koehring, Dayton, Ohio, assignors to The Moraine Products Company, Dayton, Ohio, a corporation of Ohio Application May 3, 1929. Serial No. 360,074

13 Claims. (Cl. 113—112)

This invention relates to bearing elements having a bearing-metal lining and a reinforcing backing of a different metal, especially bearing elements having a bearing lining of porous bronze and a reinforcing backing of ferrous metal, particularly heat treated steel.

Reference is made to copending applications, Serial No. 188,929 filed May 5, 1927, Patent No. 1,768,528, and Serial No. 221,341 filed Sept. 22, 1927, Patent No. 1,834,746, by Charles R. Short, wherein there is disclosed methods of making bearing elements by forming a relatively thin sheet of porous metal and attaching it to a steel or other metal backing by an intervening tin or other metal bonding-coating applied either to the lining or backing or both, all the metals being bonded or alloyed together by heat.

It has been found that in these bearings under severe use there is a tendency for the bearing lining to become loose due to a loosening of the tin bond from the backing, or due to the relatively low melting temperature of substantially pure tin, or one or more various other causes.

Now the present invention has for its object the overcoming of such bonding difficulties between bearing linings and their metal backings, particularly to provide an improved method of securely and permanently bonding a bronze or other copper alloy part to a ferrous metal part, which bond will be very strong at a relatively high temperature.

In the methods described in the above mentioned copending applications, whenever there is in the finished bearing a layer of free or unalloyed tin between the lining and backing, the maximum temperature at which such bearing can be run may be limited by the melting point of tin. The strength of the bond is of course greatly reduced as its temperature approaches the melting point of tin. Now the present invention provides a bond between the ferrous metal and the bronze by the use of tin, but in such manner that in the finished product the tin is so alloyed with copper that its melting point is raised above the maximum running temperature of the bearing which therefore may be above the melting point of tin. Briefly, this object is accomplished by providing a very thin tin coating interposed between two metal surfaces both of which will alloy or diffuse into the tin (such as copper or copper alloy), and heating for a sufficient time and at a sufficient temperature to cause the entire thickness of tin to be alloyed with metal from adjacent metal surfaces. Since copper will readily diffuse into pure tin below 1000° F. it has been found that the pure tin layer can be converted into a copper-tin alloy without raising the temperature during this heat treatment beyond 1000° F., or if need be, beyond 900° F. or lower. Hence this invention is adapted to bond a bronze bearing lining directly to a heat treated steel part without raising the temperature of the heat treated steel part to a point where the temper of the steel will be impaired.

For the purpose of illustrating the method of this invention, it has been described in connection with a connecting rod and cap bearing of an internal combustion engine.

Further objects and advantages of the present invention will be apparent from the following description, reference being had to the accompanying drawing, wherein a preferred embodiment of one form of the present invention is clearly shown.

Figure 2:
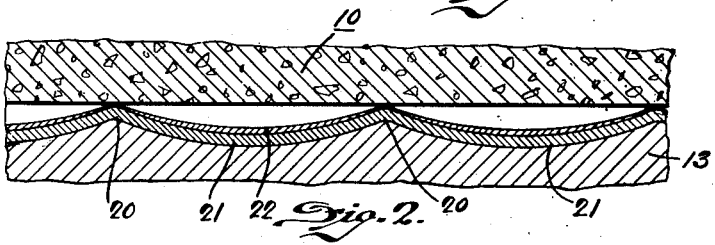
Fig. 2 represents a microscopic view, magnified something like 125 times, of a section taken along line 2—2 of Fig. 1 prior to the heat treating or bonding step.
Figure 3:
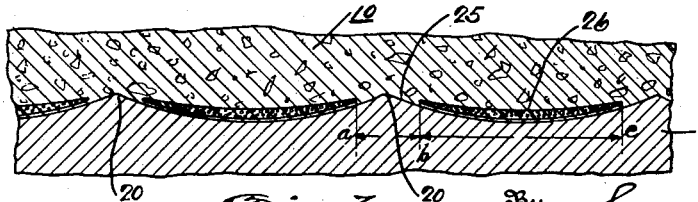
Fig. 3 is a view similar to Fig. 2, but represents the section after the bonding step is completed.

In the embodiment illustrated the semi-cylindrical porous bronze linings 10 are first made according to the above mentioned copending applications, or according to any other well known and suitable methods. The preliminary forming of the linings 10 per se constitutes no part of this present invention and therefore need not be described in detail herein. The semi-cylindrical surfaces 12 of the heat treated steel connecting rod 11 and the cap 13 are preferably left rough or finely serrated by the tool marks when these surfaces are machined. These fine serrations may vary in width and depth considerably, but Figs. 2 and 3 illustrate the high ridges or lands 20 highly magnified from an actual distance apart of about 1/64 of an inch. The serrated steel surfaces 12 are first copper plated by any suitable known method, preferably to a thickness of about .002 inch of Cu. In Fig. 2 this Cu plating is designated by 21 and is represented as of substantially even thickness over the lands and grooves of the serrated steel surface. Next a very thin tin coating 22 is applied to the copper plating 21 by any suitable means which will give a minimum thickness of tin coating. A suitable flux should be used before tinning, such as a water solution of zinc chloride which has been found satisfactory for this purpose. If the tinning is done by dipping, all excess tin should be removed by some suitable method, such as by wiping off while hot with a rag or brush in a direction following the serrations. The tin coating 22 should completely cover the copper coating 21 and yet preferably be of the minimum thickness possible, such for instance as .0002 inch. It has been found that the tin coating can be made extremely thin at the high areas, that is, on the summits of the lands 20, while in the grooves between the lands it is somewhat thicker, as has been roughly illustrated in Fig. 2.

Now having thus prepared the steel surfaces 12 with Cu and tin coatings, the tin surfaces are again fluxed with a suitable flux as, for example, a water solution of zinc chloride, and the porous bronze linings 10 assembled thereupon and the rod 11 and cap 13 then assembled upon a bronze plug 15 of the desired diameter by means of the bolts 16 and nuts 17 which should be drawn tight. There should be sufficient clearance between the meeting edges of the upper and lower steel parts as well as the linings 10 to insure that the clamping pressure will be all taken directly upon the bearing surfaces of the linings. The bronze plug 15 having a greater coefficient expansion than steel, assures that pressure will be applied to the joint to be bonded together all during the bonding heat treatment.

The bronze plug 15 should preferably be first coated with graphite and oil and baked to provide a coating thereon, or any other suitable method may be used which will prevent possibility of plug 15 sticking to the porous bronze lining after the bonding heat treatment, and therefore permit ready disassembly of the parts.

Figure 1:
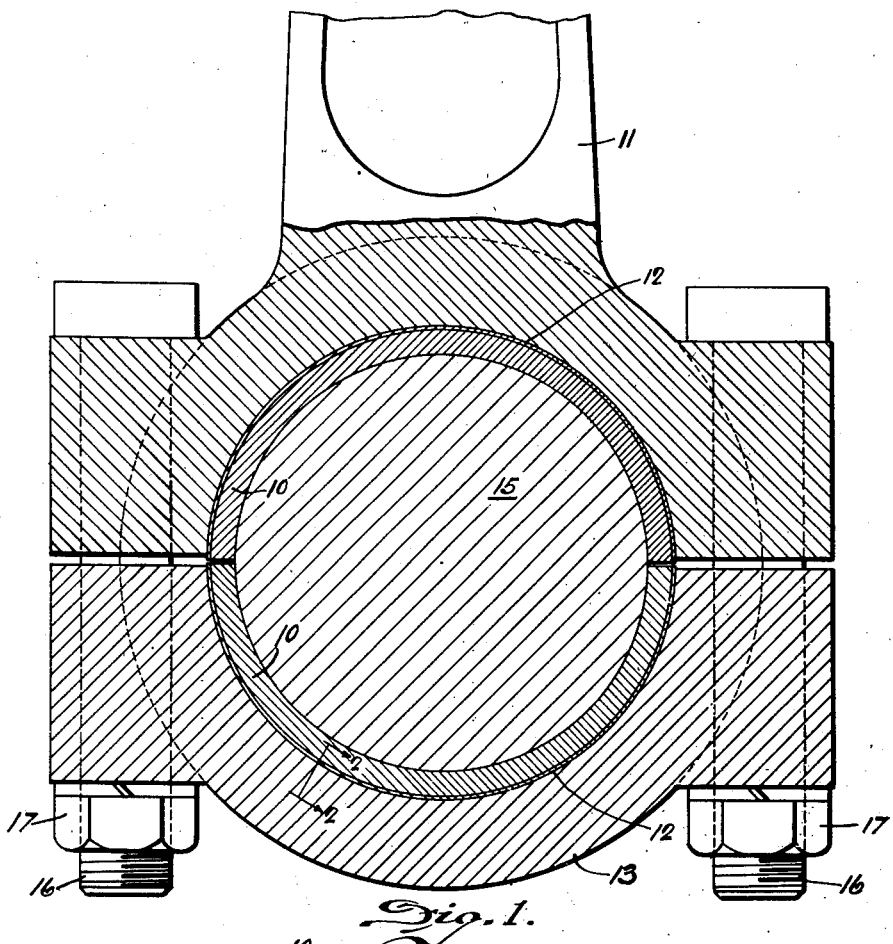
Fig. 1 represents a section through a heat treated steel connecting rod bearing assembled upon a bronze plug during the bonding step of the process, the thickness of the bonding layer, however, being greatly exaggerated for the sake of clearness.

The assembly, shown in Fig. 1, is next heated to such a temperature and for such a time as will cause some of the copper of the copper plating 21 and some of the copper in the porous bronze lining 10 to alloy or diffuse into the tin layer 22 to such an extent that substantially all the tin becomes alloyed with copper and its melting point thereby materially raised, and in the meantime a strong bond is obtained between the copper plate 21 and the porous bronze 10 by this intervening layer of copper-tin alloy. The Cu plate 21 of course remains firmly bonded to the steel on its opposite side and hence the entire series of layers is bonded securely together.

It has been found by microscopic examination that the tin coating is thinnest at the tops of the lands 20, and for this reason, presumably, the Cu entering the tin layer from both sides thereof converts the tin layer into a bronze of high copper content at these high areas 25 (designated in Fig. 3 by the distance $a-b$). These bronze areas 25 are strong and tough and provide the main physical bond between the lining 10 and the steel.

In the grooves, or low areas 26 (designated in Fig. 3 by the distance from $b$ to $c$) where the tin layer was thicker and where the clamping pressure between the layers is obviously smaller than at the lands 20, the diffusion of the copper through the tin layer is slower and the tin layer is apparently converted into the relatively hard and brittle $Cu_3Sn$ compound by the diffusion into the tin of copper from both sides thereof. Such $Cu_3Sn$ compound has a sufficiently high melting point to withstand the highest desired running temperatures for bearings and also aids greatly in the thermal bond between the porous bronze 10 and the steel back for rapid conduction of heat away from the bearing material. It has been found, however, that the bond given by the tough bronze at the high areas 25 provides all the necessary physical strength and the brittleness of the $Cu_3Sn$ in the low areas 26 is immaterial.

The above described bonding may be obtained by a heat treatment which will not impair the temper of the steel parts 11 and 13. The preferred method of such heat treatment at the present time comprises placing the assemblies shown in Fig. 1 in a closed container together with a fluxing material which volatilizes at or something below the desired bonding temperature and heating the container in a furnace for a period varying from 15 to 60 minutes at a maximum temperature which will not impair the temper of the steel parts, for instance, at 800° to 900° F. This method of heating in a closed container within a fluxing atmosphere is more fully described and claimed in a copending application, Serial No. 333,014, filed Jan. 16, 1929, by Charles R. Short.

Of course, if desired, other suitable methods of heating to the desired temperature in a non-oxidizing atmosphere may be used, such for instance as dipping the assemblies of Fig. 1 in a molten lead bath maintained at the desired temperature. After removal from the lead bath, any lead which may adhere to the assembly can be easily removed with a wire brush while hot.

In such bonding heat treatments, at the higher temperatures a more complete diffusion of the Cu into the tin occurs, while at the lower temperatures greater amount of the brittle $Cu_3Sn$ remains. However it has been found that the diffusion of the Cu into the tin can be increased with the length of time of heating, hence a longer period of heating at a lower temperature corresponds to a shorter period at a higher temperature. Therefore if there are no heat treated steel or other heat treated parts to protect from the higher temperatures, the bonding heat treatment of this invention may be carried out at temperatures much higher than 900° F., say up to 1400° F. and a saving of time of heating thus obtained.

The fundamental teachings of this invention are not limited to the use of bronze bearing linings, or a ferrous metal backing, or the use of any particular metals for forming the bonding alloy or alloys. For instance, instead of forming the bonding alloy from copper and tin, as described above, it may be formed from brass and tin, zinc and tin, cadmium and tin, copper and zinc, or other combinations of metals, by forming the metal coatings 21 and 22 accordingly. In each case there is formed a good bonding alloy intermediate the parts which are to be bonded together, having a higher melting point than that of its lowest melting component. If the bearing lining is of aluminum instead of bronze as described above, the coating 21 may be of copper with the coating 22 of zinc.

It is to be understood that this invention is not limited to the specific examples disclosed hereinabove for illustrative purposes, but only by what is claimed herebelow.

What is claimed is as follows:

1. The method of making a bearing element comprising: coating a ferrous metal backing with copper, pressing a bronze bearing lining against said copper coated backing with a thin layer of tin between said lining and copper, and heating the assembly below the melting point of copper for such length of time as to cause the entire thickness of the tin layer to alloy with the copper on each surface thereof, whereby the bronze lining is firmly bonded to the ferrous metal backing.

2. The method of bonding a bronze structure to ferrous metal comprising: copper-plating the ferrous metal, pressing the bronze structure against the copper coated ferrous metal with a thin layer of tin therebetween, and heating the assembly below the melting point of copper for such length of time as to cause the entire thickness of the tin layer to alloy with both the copper plating and the bronze.

3. The method of bonding a bronze structure to ferrous metal comprising: copper-plating the ferrous metal, pressing the bronze structure against the copper coated ferrous metal with a thin layer of bonding metal therebetween, and heating the assembly below the melting point of copper for such length of time as to cause the entire thickness of the layer of bonding metal to alloy with both the copper plating and the bronze.

4. The method of bonding a tin-alloying metal to ferrous metal comprising: copper-plating the ferrous metal, pressing the tin alloying metal against the copper coated ferrous metal with a thin layer of tin therebetween, and heating the assembly below the melting point of copper for such length of time as to cause the entire thickness of the tin layer to alloy with both the copper plating and the tin-alloying metal.

5. The method of bonding a tin-alloying metal to ferrous metal comprising: copper-plating the ferrous metal, applying a thin coating of tin to the copper-plated surface, pressing the tin alloying metal against the copper and tin coated surface and heating the assembly below the melting point of copper for such time as to cause the entire thickness of the tin layer to alloy with the metal on each side thereof.

6. The method of bonding a metal part to a second metal part comprising: pressing the two metal parts together, with a thin layer of bonding metal therebetween said bonding metal being such that it will alloy with the surface of each of said metal parts under moderate pressure and temperatures, and then heating the parts while pressed together to such moderate temperature as will fuse said thin bonding layer and not fuse said two metal parts but for such length of time as to cause the entire thickness of the layer of bonding metal to alloy with the metal on each surface thereof.

7. The method of bonding a ferrous metal part to a second metal part comprising: copper-plating the bonding surface of the ferrous metal part, pressing the two metal parts together with a thin layer of bonding metal there-between, said bonding metal being such that it will alloy with both the copper coating and the second metal part, and then heating the parts while pressed together below the melting point of copper for such lengths of time as to cause the entire thickness of the layer of bonding metal to alloy with the two contacting metal surfaces.

8. The method of bonding a tempered steel part to a second metal part without adversely affecting the temper of the steel, comprising: copper-plating the bonding surface of the steel part, pressing the two metal parts together with a thin layer of bonding metal therebetween, said bonding metal being such that it will alloy with both the copper coating and with the second metal part at moderate temperatures, and then heating the parts in pressed together relation to such moderate temperatures as will not harm the temper of the steel but for such length of time as to cause the entire thickness of the bonding metal to alloy with the two contacting metal surfaces.

9. The method of bonding a tempered steel part to a tin-alloying metal part comprising: copper plating the bonding surface of the steel part, pressing the two metal parts together with a thin layer of tin therebetween, and then maintaining the parts while pressed together at such moderate temperature as will fuse said thin layer of tin but not seriously harm the temper of the steel until the entire thickness of the tin layer is substantially all alloyed with the contacting metal of adjacent parts.

10. The method of bonding a ferrous metal part to a copper-containing part comprising: providing a finely serrated or roughened bonding surface on the ferrous metal, copper plating said roughened surface, tin coating over the copper leaving a very thin coat of tin on the high areas on said roughened surface, pressing the copper-containing part against the tin coated surface and heating to such a temperature as will fuse only said tin coating until the entire thickness of the very thin tin coating on said high areas is substantially all alloyed with the copper metal on each side thereof.

11. The method of bonding a ferrous metal part to a copper alloy part comprising: providing a finely serrated or roughened bonding surface on the ferrous metal, copper plating said roughened surface, tin coating over the copper leaving a very thin coat of tin on the high areas on said roughened surface, pressing the copper alloy part against the tin coated surface and heating in a fluxing atmosphere to only a moderate temperature until the entire thickness of the very thin tin coating on said high areas is substantially all alloyed with the metal on each side thereof.

12. The method of bonding a ferrous metal part to a copper alloy part comprising: providing a finely serrated or roughened bonding surface on the ferrous metal, copper plating said roughened surface, tin coating over the copper leaving a very thin coat of tin on the high areas on said roughened surface, pressing the copper alloy part against the tin coated surface and heating in a fluxing atmosphere to a temperature below 1100° F. until the entire thickness of the very thin tin coating on said high areas is alloyed with copper.

13. The method of bonding a heat-treated ferrous metal part to a copper alloy part comprising: providing a finely serrated or roughened bonding surface on the ferrous metal, copper plating said roughened surface, tin coating over the copper leaving a very thin coat of tin on the high areas on said roughened surface, pressing the copper alloy part against the tin coated surface and heating to a temperature which will not impair the prior heat treatment of said metal parts until the entire thickness of the very thin tin coating on said high areas is substantially all alloyed with copper.

CHARLES R. SHORT.
ROLAND P. KOEHRING.